United States Patent
Saito (10) Patent No.: US 7,689,192 B2
(45) Date of Patent: Mar. 30, 2010

(54) NOISE CANCELER AND RECEIVING APPARATUS USING THE SAME

(75) Inventor: Yasuji Saito, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 444 days.

(21) Appl. No.: 11/767,377

(22) Filed: Jun. 22, 2007

(65) Prior Publication Data
US 2007/0297622 A1 Dec. 27, 2007

(30) Foreign Application Priority Data
Jun. 27, 2006 (JP) ............................. 2006-176712

(51) Int. Cl.
*H04B 1/00* (2006.01)
*H04B 7/00* (2006.01)
(52) U.S. Cl. ..................... 455/296; 455/278.1; 455/222
(58) Field of Classification Search ................. 455/501, 455/63.1, 296, 278.1, 277.2, 114.2, 142, 455/222; 375/254, 346
See application file for complete search history.

(56) References Cited

U.S. PATENT DOCUMENTS

| 7,269,237 | B2 * | 9/2007 | Taira ........................... 375/346 |
| 7,366,491 | B1 * | 4/2008 | Suzuki et al. ................ 455/296 |
| 7,561,860 | B2 * | 7/2009 | Matsumoto .............. 455/189.1 |
| 2007/0298749 | A1 * | 12/2007 | Saito et al. .................. 455/303 |
| 2009/0068973 | A1 * | 3/2009 | Saito .......................... 455/296 |

FOREIGN PATENT DOCUMENTS

| JP | 02-283129 | 11/1990 |
| JP | 11-186924 | 7/1999 |
| JP | 2001-036422 | 2/2001 |
| JP | 2005-277565 | 10/2005 |

* cited by examiner

*Primary Examiner*—Sonny Trinh
(74) *Attorney, Agent, or Firm*—SoCal IP Law Group LLP; Steven C. Sereboff; John E. Gunther (57) ABSTRACT

A noise canceler comprising: a first low-pass filter that a demodulated signal is to be input to; an interpolation processing unit that the demodulated signal after passing through the first low-pass filter and a pulse noise detection signal indicating presence of a pulse noise, are to be input to, the interpolation processing unit configured to perform interpolation processing on a demodulated signal present during a period determined by the pulse noise detection signal, out of the input demodulated signal, based on the input demodulated signal; a replacing processing unit that the demodulated signal subjected to the interpolation processing, the pulse noise detection signal, and the demodulated signal before passing through the first low-pass filter, are to be input to, the replacing processing unit configured to output a signal obtained by replacing a demodulated signal present during the period, out of the demodulated signal before passing through the first low-pass filter, with the demodulated signal subjected to the interpolation processing, wherein the demodulated signal is present during the period; and a second low-pass filter that the signal output from the replacing processing unit is to be input to, the second low-pass filter including a cut-off frequency higher than that of the first low-pass filter.

4 Claims, 11 Drawing Sheets

NOISE CANCELER AND RECEIVING APPARATUS USING THE SAME

CROSS-REFERENCE TO RELATED APPLICATION

This application claims the benefit of priority to Japanese Patent Application No. 2006-176712, filed Jun. 27, 2006, of which full contents are incorporated herein by reference.

BACKGROUND OF THE INVENTION

1. Field of the Invention

The present invention relates to a noise canceler and a receiving apparatus using the same and relates to a technology for improving quality of a signal reproduced by a receiving apparatus.

2. Description of the Related Art

Figure 7:
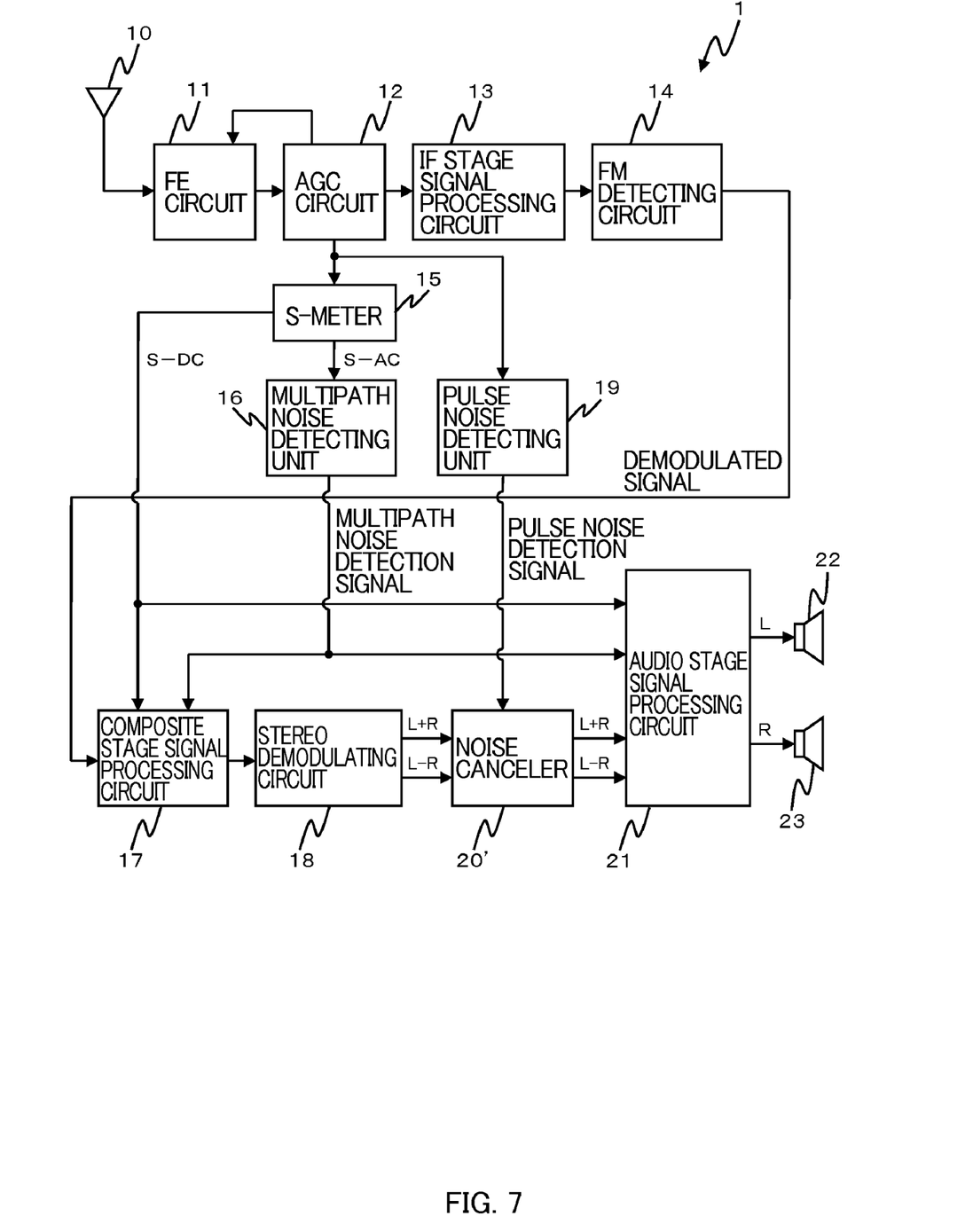
FIG. 7 is a diagram of an example of the FM receiving apparatus 1.

FIG. 7 shows a configuration of an FM receiving apparatus 1. The FM receiving apparatus 1 comprises an antenna 10, a front end (FE) circuit 11 for performing tuning and high frequency amplification of a received signal and converting the received signal to an intermediate frequency signal, an AGC (AGC: Automatic Gain Control) circuit 12 for controlling an amplification gain in the FE circuit 11 depending on field strength of the intermediate frequency signal, an IF stage signal processing circuit 13 comprising an amplifying circuit for amplifying the intermediate frequency signal and a limiter circuit, an FM detecting circuit 14 for demodulating the intermediate frequency signal, an S-meter 15 for outputting an alternating current (S-AC) and a direct current (S-DC) corresponding to the field strength of the intermediate frequency signal based on the intermediate frequency signal output from the AGC circuit 12, a multipath noise detecting unit 16 for outputting a multipath noise detection signal that is a signal indicating presence or absence of the multipath noise based on the alternating current (S-AC), a composite stage signal processing circuit 17 to which the demodulated signal, the multipath noise detection signal, and the direct current (S-DC) are input and which attenuates the demodulated signal during a period in which the multipath noise is included in the signal, a stereo demodulating circuit 18 for generating a main channel signal (L+R) and a sub-channel signal (L−R) by performing matrix processing of the signal output from the composite stage signal processing circuit 17, a pulse noise detecting unit 19 for outputting a pulse noise detection signal that is a signal indicating presence of a pulse noise such as an ignition noise and a mirror noise contained in the intermediate frequency signal output from the AGC circuit 12, a noise canceler 20' for removing the pulse noise contained in the main channel signal (L+R) and the sub-channel signal (L−R) output from the stereo demodulating circuit 18 based on the pulse noise detection signal, and an audio stage signal processing circuit 21 for generating an L signal and an R signal based on the main channel signal (L+R) and the sub-channel signal (L−R).

The direct current (S-DC) output from the S-meter 15 and the multipath noise detection signal output from the multipath noise detecting unit 16 are input to the audio stage signal processing circuit 21. The audio stage signal processing circuit 21 has an SP (SP: SeParation) processing unit 211 for performing separation processing of changing a degree of separation between the main channel signal and the sub-channel signal, and an HC (HC: High Cut) processing unit 212 for performing high-cut processing of improving an S/N ratio by removing a high frequency component, based on these signals.

Figure 8:
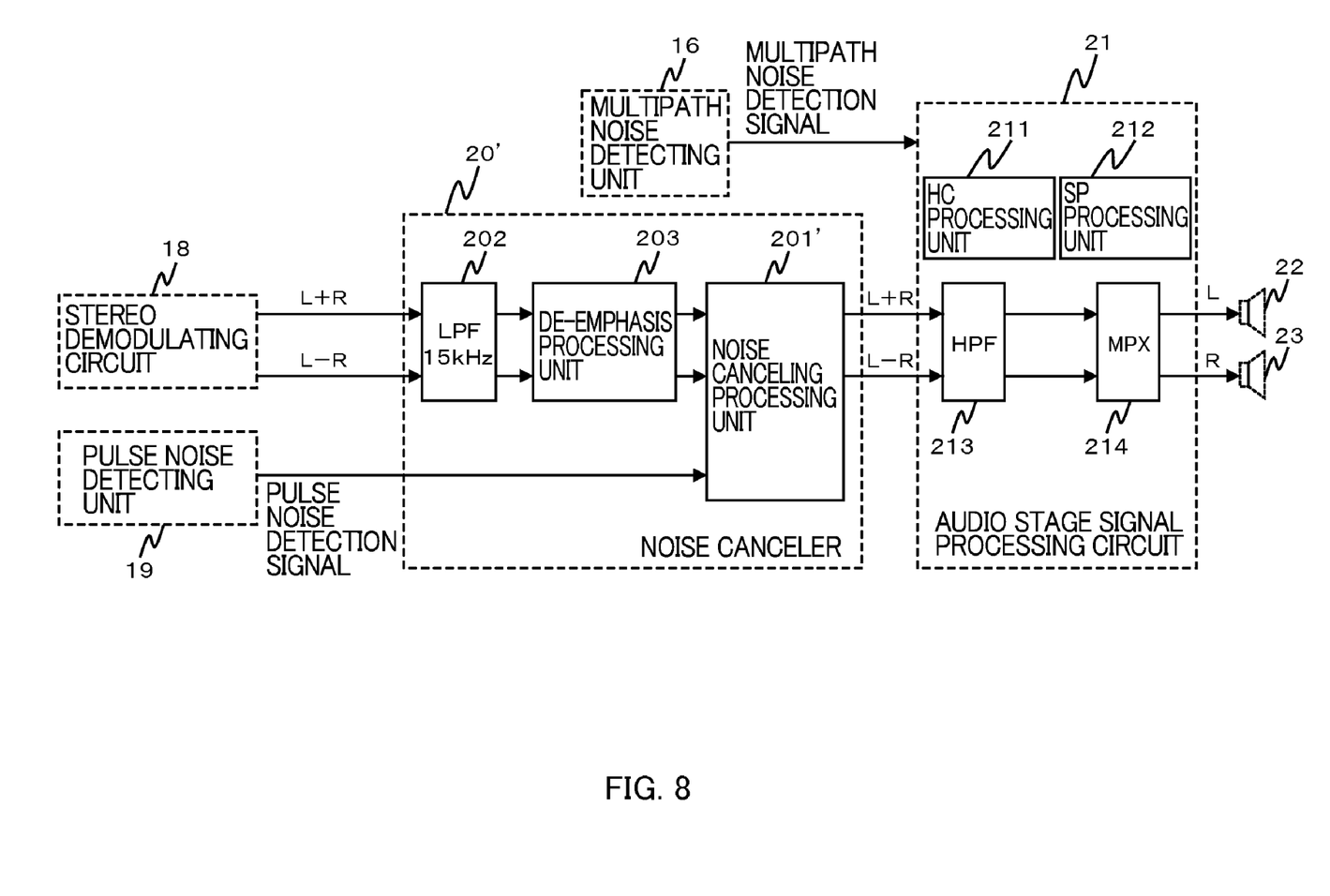
FIG. 8 is a diagram of a specific configuration of a noise canceler 20' and an audio stage signal processing circuit 21 of FIG. 7.

FIG. 8 shows a specific configuration of the noise canceler 20' and the audio stage signal processing circuit 21. The noise canceler 20' comprises a low-pass filter (LPF) 202 with a cut-off frequency of 15 kHz provided for the purpose of cutting a high-frequency noise contained in the main channel signal (L+R) and the sub-channel signal (L−R), a de-emphasis processing unit 203, and a noise canceling processing unit 201' for removing the noise by performing interpolation processing such as a linear interpolation for a period to be determined based on the pulse noise detection signal (hereinafter, interpolation period).

The audio stage signal processing circuit 21 comprises a high-pass filter (HPF) 213 for cutting a direct current component contained in the main channel signal (L+R) and the sub-channel signal (L−R) and a multiplexer (MPX) 214 for generating an L signal and an R signal by the main channel signal (L+R) and the sub-channel signal (L−R).

Length of the interpolation period during which the interpolation processing is performed by the noise canceling processing unit 201' is stored as a fixed vale in the noise canceler 20'. The noise canceling processing unit 201', upon detecting the presence of the pulse noise by the pulse noise detection signal, sets the length of the period corresponding to the fixed value from the time of the detection of the pulse noise as the interpolation period and performs the interpolation processing of the signal during thus set interpolation period. (see Japanese Patent Application Laid-Open Publication Nos. 1990-283129, 2001-36422, and 2005-277565)

Since the low-pass filter 202 causes a pulse width of the pulse noise mixed in the main channel signal (L+R) and the sub-channel signal (L−R) to be extended, the fixed value must be set at the length sufficient to cover such extended pulse width of the pulse noise. For this reason, the interpolation period is lengthened and quality of reproduced signal of the FM receiving apparatus is unnecessarily deteriorated.

Figure 9A:
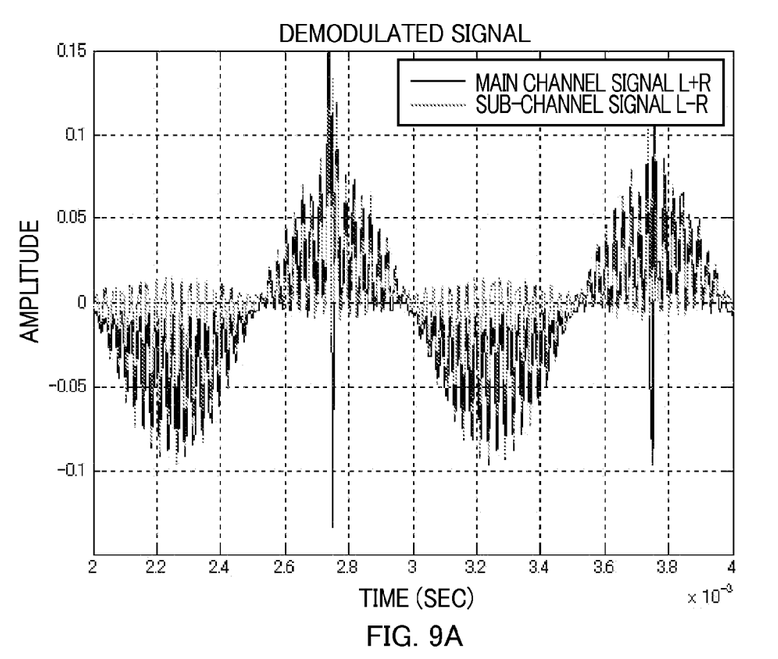
FIG. 9A represents an example of a waveform of a signal input from a stereo demodulating circuit 18 to the noise canceler 20'.
Figure 9B:
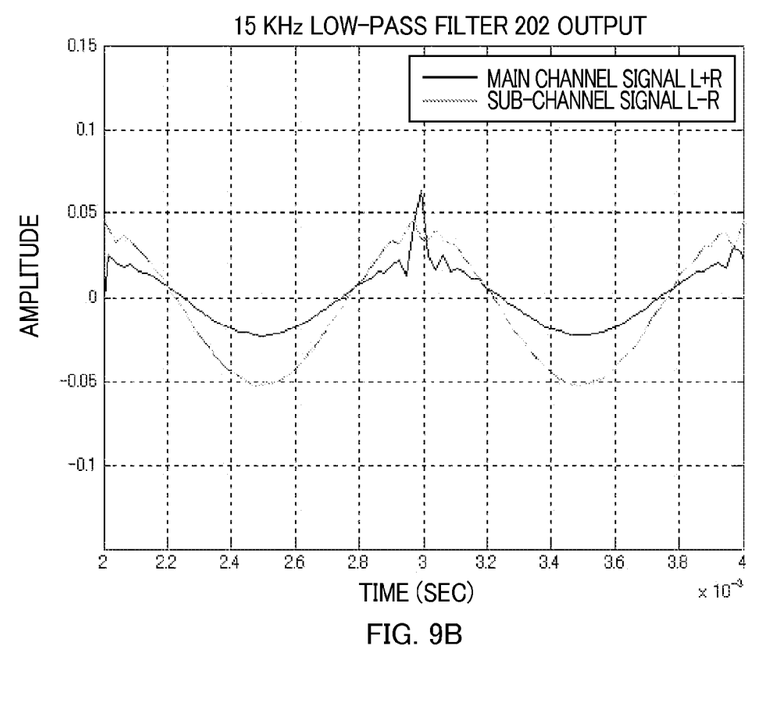
FIG. 9B is a waveform chart of a signal output from a low-pass filter 202 when a main channel signal (L+R) and a sub-channel signal (L−R) shown in FIG. 9A are input.
Figure 9C:
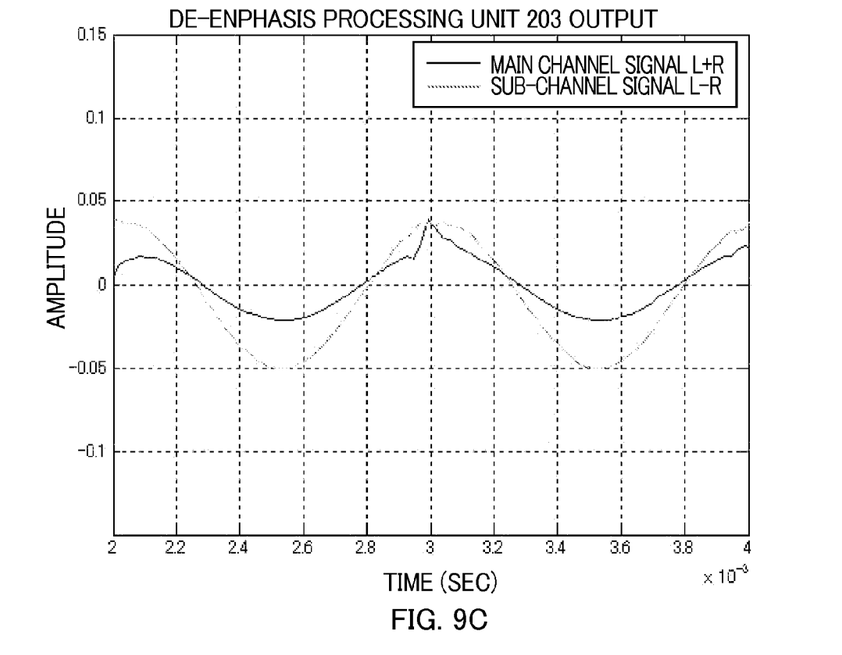
FIG. 9C is a waveform chart of a signal output from a de-emphasis processing unit 203 when the main channel signal (L+R) and the sub-channel signal (L−R) shown in FIG. 9A are input.

Description will be made more specifically. For example, when the main channel signal (L+R) and the sub-channel signal (L−R) shown in FIG. 9A are input from the stereo demodulating circuit 18, the signal output from the low-pass filter 202 will have a waveform shown in FIG. 9B. The signal output from the de-emphasis processing unit 203 will have the waveform shown in FIG. 9C and the signal output from the noise canceling processing unit 201' will have the waveform shown in FIG. 9D. The signal output from the high-pass filter 213 will have the waveform shown in FIG. 9E and the signal output from the multiplexer 214 will have the waveform shown in FIG. 9F.

Figure 9D:
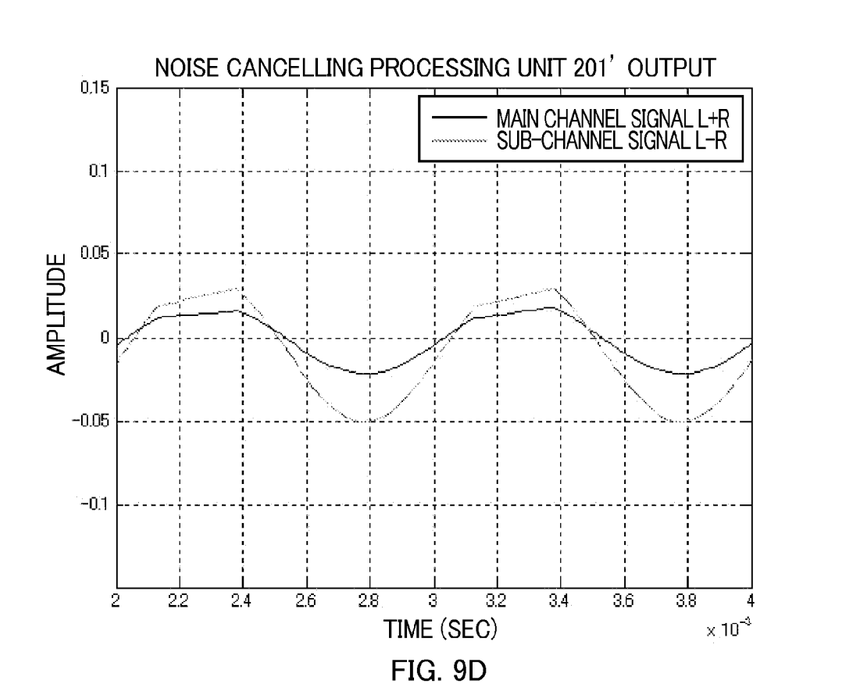
FIG. 9D is a waveform chart of a signal output from a noise canceling processing unit 201' when the main channel signal (L+R) and the sub-channel signal (L−R) shown in FIG. 9A are input.
Figure 9E:
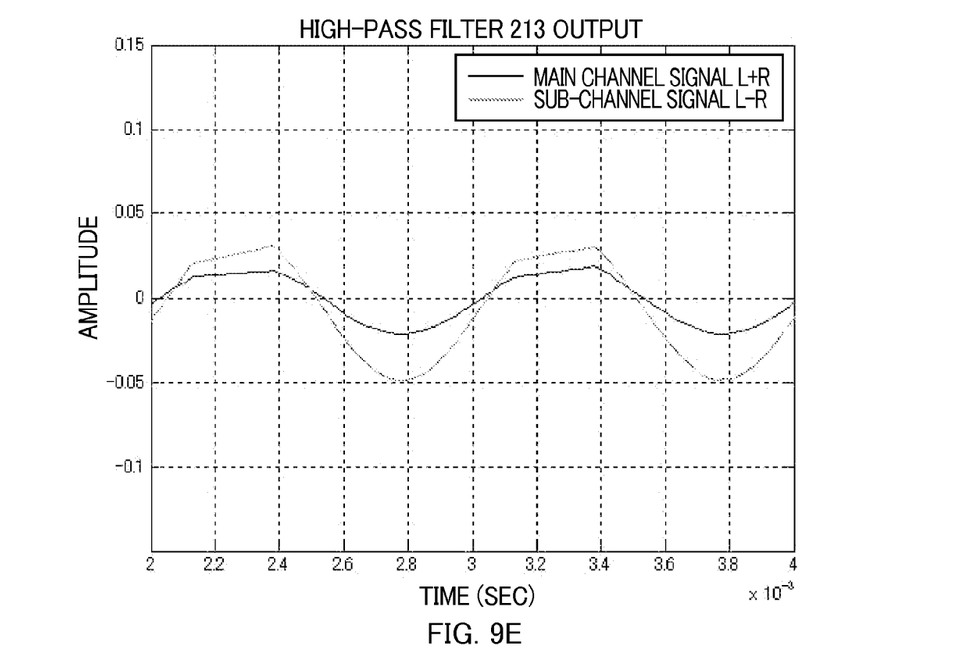
FIG. 9E is a waveform chart of a signal output from a high-pass filter 213 when the main channel signal (L+R) and the sub-channel signal (L−R) shown in FIG. 9A are input.
Figure 9F:
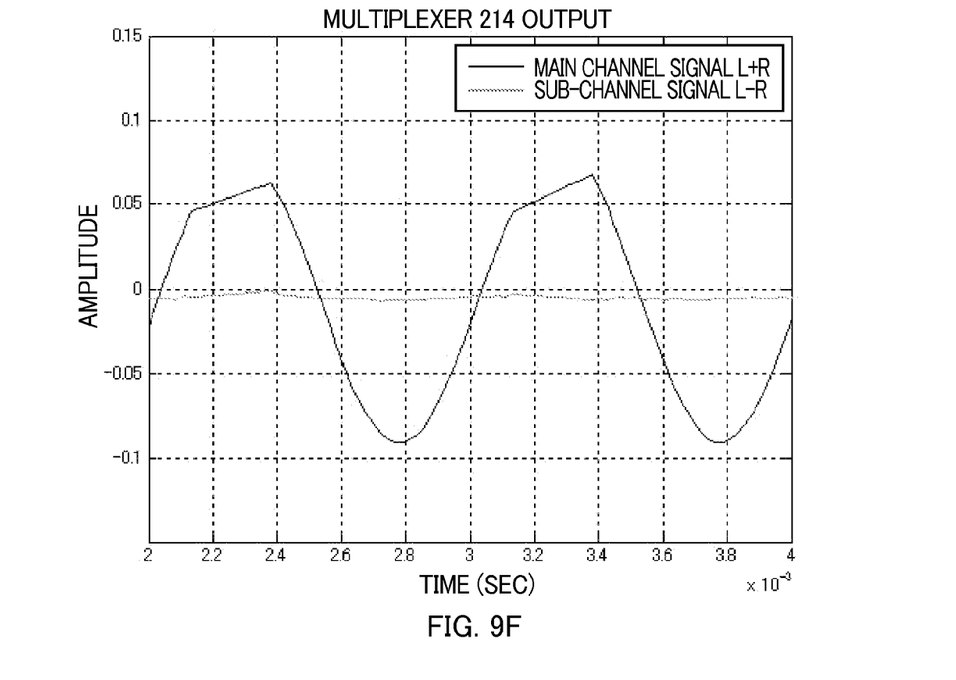
FIG. 9F is a waveform chart of a signal output from a multiplexer 214 when the main channel signal (L+R) and the sub-channel signal (L−R) shown in FIG. 9A are input.

When a comparison is made between the waveform of the original signal input from the stereo demodulating circuit 18 shown in FIG. 9A and the waveform of the signal output from the noise canceling processing unit 201' shown in FIG. 9D, the pulse noise has the pulse width on the order of $0.02 \times 10^{-3}$ in FIG. 9A, while the interpolation period has the width of $0.2 \times 10^{-3}$ or over in FIG. 9D and the interpolation period is of the order of 10 times as long as the pulse width of the original pulse noise. For this reason, as shown in FIG. 9F, the waveform of the signal output from the multiplexer 214 is considerably distorted as compared with the waveform of the original signal.

SUMMARY OF THE INVENTION

A noise canceler according to an aspect of the present invention, comprises: a first low-pass filter that a demodulated signal is to be input to; an interpolation processing unit that the demodulated signal after passing through the first low-pass filter and a pulse noise detection signal indicating presence of a pulse noise, are to be input to, the interpolation processing unit configured to perform interpolation processing on a demodulated signal present during a period determined by the pulse noise detection signal, out of the input demodulated signal, based on the input demodulated signal; a replacing processing unit that the demodulated signal subjected to the interpolation processing, the pulse noise detection signal, and the demodulated signal before passing through the first low-pass filter, are to be input to, the replacing processing unit configured to output a signal obtained by replacing a demodulated signal present during the period, out of the demodulated signal before passing through the first low-pass filter, with the demodulated signal subjected to the interpolation processing, wherein the demodulated signal is present during the period; and a second low-pass filter that the signal output from the replacing processing unit is to be input to, the second low-pass filter including a cut-off frequency higher than that of the first low-pass filter.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

A second low-pass filter in the present invention is, for example, the 15 kHz low-pass filter described above. The present invention is designed so that interpolation processing is performed before a signal passes through the second low-pass filter that causes a pulse width of a pulse noise to be extended. While a first low-pass filter is provided for the purpose of reducing an effect of a high-frequency component contained in a demodulated signal on the interpolation processing, in the interpolation processing by an interpolation processing unit, the first low-pass filter has a cut-off frequency lower than that of the second low-pass filter, causes the pulse width of the pulse noise to be less extended than the second low-pass filter does, and enables the interpolation period to be set at a shorter period as compared with the case of performing the interpolation processing after passing through the second low-pass filter. A replacing processing unit replaces, out of the demodulated signal before passing through the low-pass filter, such part of the signal that is present during the interpolation period with the signal after interpolation-processed by the interpolation processing unit during the interpolation period. By such an arrangement, the signal during the period other than the interpolation period is restored in respect of the high-frequency component cut off by the low-pass filter and as a result, quality of a reproduced signal can be prevented from deteriorating.

Figure 1:
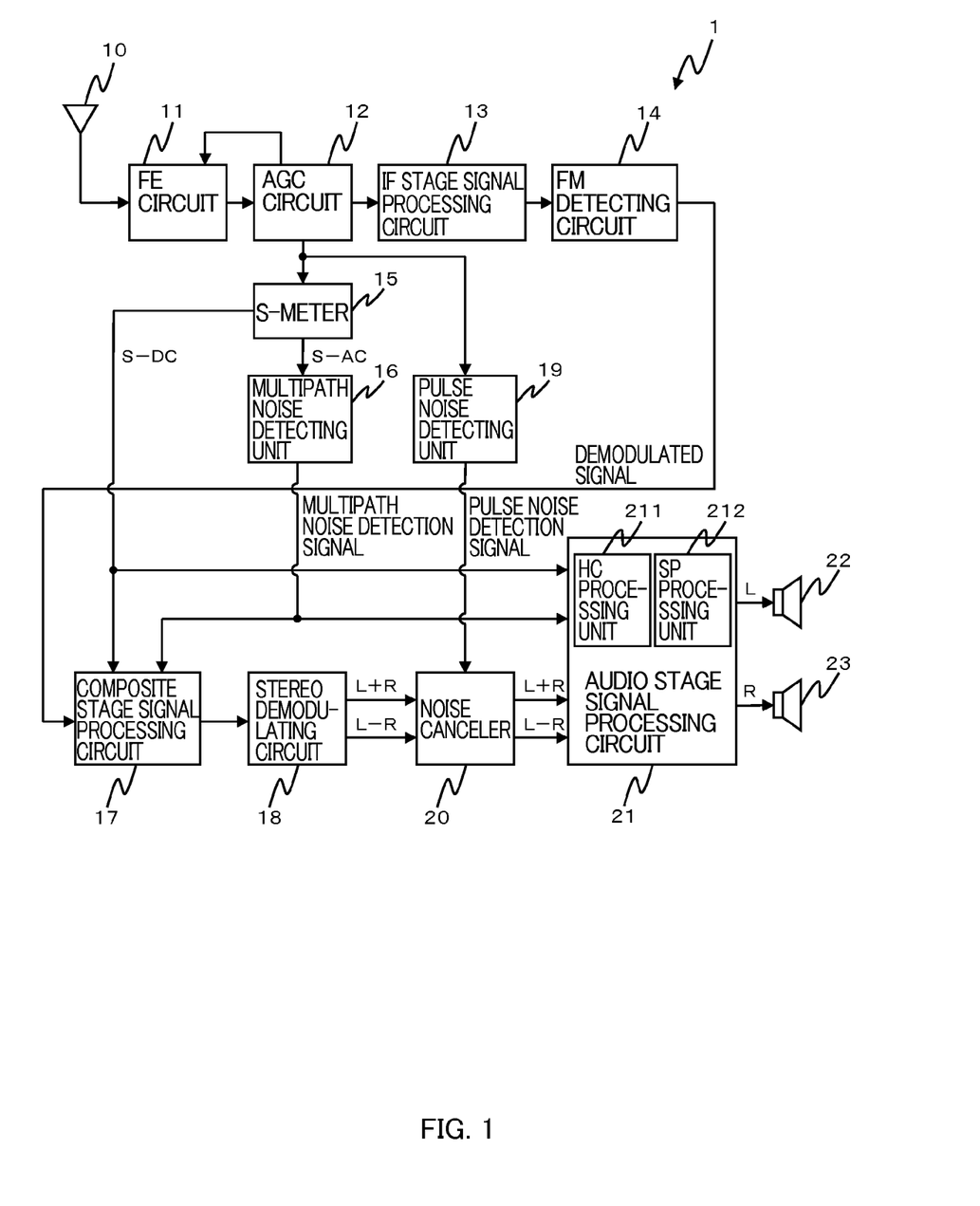
FIG. 1 is a block diagram of an FM receiving apparatus 1 according to an embodiment of the present invention.

Detailed description will then be made of embodiments of the present invention. FIG. 1 shows a configuration of an FM receiving apparatus 1 described as an embodiment of the present invention.

The FM receiving apparatus 1 shown in FIG. 1 comprises an antenna 10, a front end (FE) circuit 11 for performing tuning and high frequency amplification of a received signal and converting the received signal to a signal of intermediate frequency (hereinafter, intermediate frequency signal), an AGC (AGC: Automatic Gain Control) circuit 12 for controlling an amplification gain in the FE circuit 11 depending on field strength of the intermediate frequency signal, an IF stage signal processing circuit 13 comprising an amplifying circuit for amplifying the intermediate frequency signal and a limiter circuit, an FM detecting circuit 14 for demodulating the intermediate frequency signal, an S-meter 15 for outputting an alternating current (S-AC) and a direct current (S-DC) corresponding to the field strength of the intermediate frequency signal based on the intermediate frequency signal output from the AGC circuit 12, a multipath noise detecting unit 16 for outputting a multipath noise detection signal that is a signal indicating presence or absence of the multipath noise based on the alternating current (S-AC), a composite stage signal processing circuit 17 to which the demodulated signal, the multipath noise detection signal, and the direct current (S-DC) are input and which attenuates the demodulated signal during a period in which the multipath noise is included in the signal, a stereo demodulating circuit 18 for generating a main channel signal (L+R) and a sub-channel signal (L−R) by performing matrix processing of the signal output from the composite stage signal processing circuit 17, a pulse noise detecting unit 19 for outputting a pulse noise detection signal that is a signal indicating presence of a pulse noise such as an ignition noise and a mirror noise contained in the intermediate frequency signal output from the AGC circuit 12, a noise canceler 20 for removing the pulse noise contained in the main channel signal (L+R) and the sub-channel signal (L−R) output from the stereo demodulating circuit 18 by performing the interpolation processing such as a linear interpolation during a period to be determined based on the pulse noise detection signal (hereinafter, interpolation period), and an audio stage signal processing circuit 21 for generating an L signal and an R signal based on the main channel signal (L+R) and the sub-channel signal (L−R).

The multipath noise detection signal output from the multipath noise detecting unit 16 is a signal that assumes one logical value during a predetermined period when the multipath noise is detected and assumes the other logical value during the period other than the predetermined period.

The pulse noise detection signal output from the pulse noise detecting unit 19 is a signal that assumes one logical value during a predetermined period if the pulse noise is detected and assumes the other logical value during the period other than the predetermined period. A noise canceling processing unit 201 stores the length of the interpolation period during which the interpolation is performed as a fixed vale and, upon detecting the presence of the pulse noise by the pulse noise detection signal, sets the length of the period corresponding to the fixed value from the time of the detection of the pulse noise as the interpolation period.

The direct current (S-DC) output from the S-meter 15 and the multipath noise detection signal output from the multipath noise detecting unit 16 are input to the audio stage signal processing circuit 21. The audio stage signal processing circuit 21 has an SP (SP: separation) processing unit 211 for performing separation processing of changing a degree of separation between the main channel signal and the sub-channel signal, and an HC (HC: High Cut) processing unit 212 for performing high-cut processing of improving an S/N ratio by removing a high frequency component, based on these signals.

Figure 2:
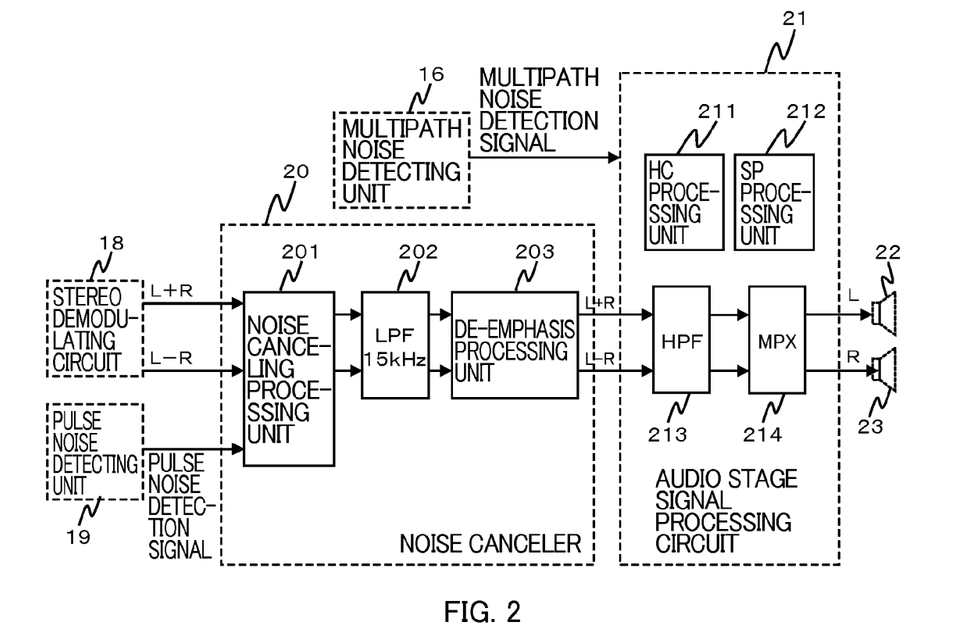
FIG. 2 is a diagram of a specific configuration of a noise canceler 20 and an audio stage signal processing circuit 21 according to an embodiment of the present invention.

FIG. 2 shows a specific configuration of the noise canceler 20 and the audio stage signal processing circuit 21. The noise canceler 20 can be realized by, for example, a DSP (Digital Signal Processor). The noise canceler 20 comprises a noise canceling processing unit 201 for removing the pulse noise contained in the main channel signal (L+R) and the sub-channel signal (L−R) based on the pulse noise detection signal, a low-pass filter 202 (second low-pass filter) with a cut-off frequency of 15 kHz provided for the purpose of cutting a high-frequency noise contained in the main channel signal (L+R) and the sub-channel signal (L−R), and a de-emphasis processing unit 203 for bringing back to an original condition a high frequency part of the main channel signal (L+R) and the sub-channel signal (L−R) emphasized by a pre-emphasis processing at a transmitter side.

The audio stage signal processing circuit 21 comprises a high-pass filter (HPF) 213 for cutting a direct current component contained in the main channel signal (L+R) and the sub-channel signal (L−R) and a multiplexer 214 for generating an L signal and an R signal by the main channel signal (L+R) and the sub-channel signal (L−R).

Figure 3:
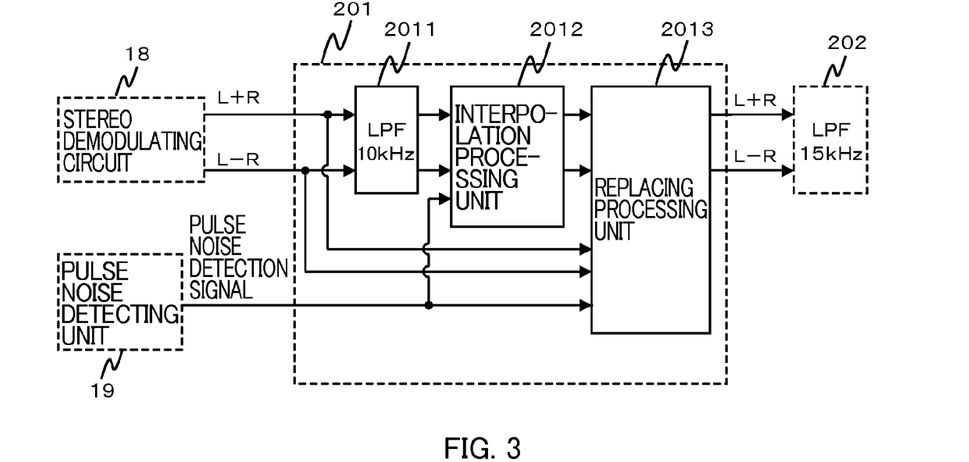
FIG. 3 is a block diagram of a noise canceling processing unit 201 according to an embodiment of the present invention.

FIG. 3 shows a configuration of the noise canceling processing unit 201. The noise canceling processing unit 201 comprises: a low-pass filter 2011 (first low-pass filter) of the cut-off frequency of 10 kHz to which the main channel signal (L+R) and the sub-channel signal (L−R) output from the stereo demodulating circuit 18 is input; a interpolation processing unit 2012 for performing the interpolation processing on the signal that is present during the interpolation period, out of the main channel signal (L+R) and the sub-channel signal (L−R) that have passed through the low-pass filter 2011, based on the signals of the main channel signal (L+R) and the sub-channel signal (L−R); and a replacing processing unit 2013 for replacing the signal that is present during the interpolation period, out of the main channel signal (L+R) and the sub-channel signal (L−R) before passing through the low-pass filter 2011, with the post-interpolation-processing signal interpolated at the interpolation processing unit 2012 during the interpolation period.

Figure 4:
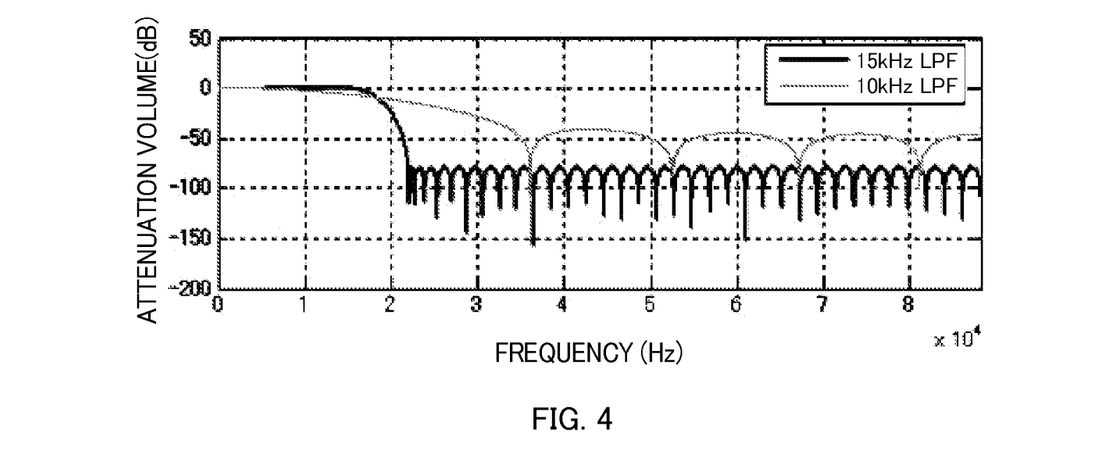
FIG. 4 is a chart of frequency-attenuation characteristics of a low-pass filter 2011 according to an embodiment of the present invention.

It is for the purpose of reducing an effect of the high frequency component contained in the main channel signal (L+R) and the sub-channel signal (L−R) on the interpolation processing that the interpolation processing is performed not directly to the main channel signal (L+R) and the sub-channel signal (L−R) input from the stereo demodulating circuit 18 but to the signals after passing through the low-pass filter 2011 (cut-off frequency of 10 kHz), as seen above. To reduce the extension of the pulse width of the pulse noise, the low-pass filter 2011 (cut-off frequency of 10 kHz) to be selected is, for example, as shown in FIG. 4, a low-pass filter whose inclination of frequency-attenuation volume characteristics in the neighborhood of the cut-off frequency is smaller (more moderate) than that of the low-pass filter 202 (cut-off frequency of 15 kHz) provided at a later stage. Such a low-pass filter 2011 can be realized by, for example, an FIR system (FIR: Finite Impulse Response System) or an IIR system (IIR: Infinite Impulse Response System).

On the other hand, the signal output from the interpolation processing unit 2012 is not directly taken as the output of the noise canceling processing unit 201, but it is so arranged that at the replacing processing unit 2013, out of the main channel signal (L+R) and the sub-channel signal (L−R) not passing through the low-pass filter 2011, such part of the signal that is present during the interpolation period is replaced with the signal interpolated at the interpolation processing unit 2012 and that during the period other than the interpolation period, the original main channel signal (L+R) and sub-channel signal (L−R) are output. Such an arrangement is made for the purpose of restoring the high frequency component cut off by the low-pass filter 2011 for the signal during the period other than the interpolation period and for this reason, the quality of the reproduced signal can be prevented from deteriorating due to passing through the low-pass filter 2011.

<Description of Processing>

Figure 5A:
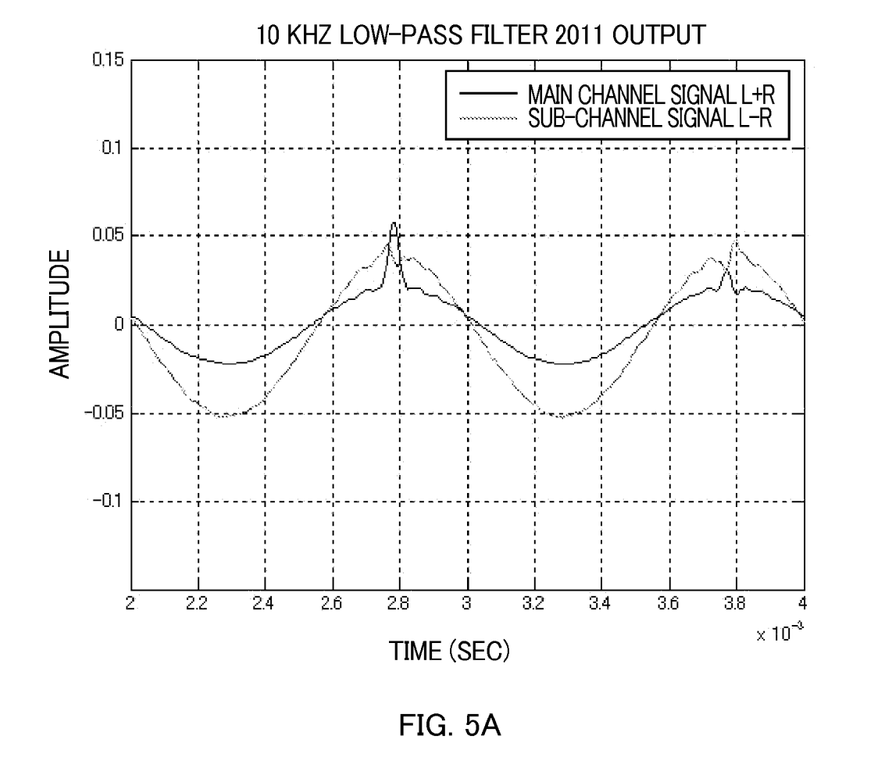
FIG. 5A is a waveform chart of a signal output from the low-pass filter 2011 when a main channel signal (L+R) and a sub-channel signal (L−R) are input to the noise canceling processing unit 201 according to an embodiment of the present invention.
Figure 5B:
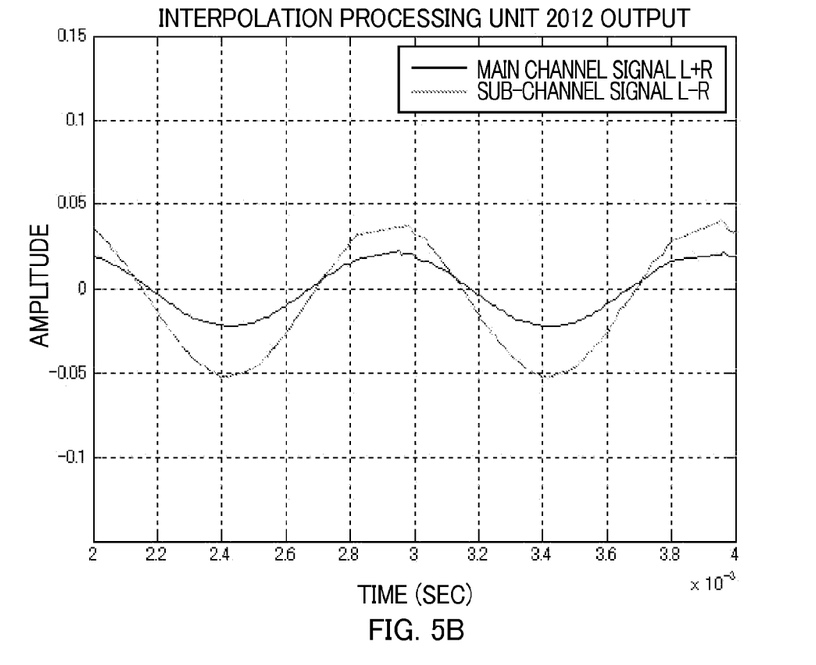
FIG. 5B is a waveform chart of the main channel signal (L+R) and the sub-channel signal (L−R) output from an interpolating processing unit 2012 according to an embodiment of the present invention.
Figure 5C:
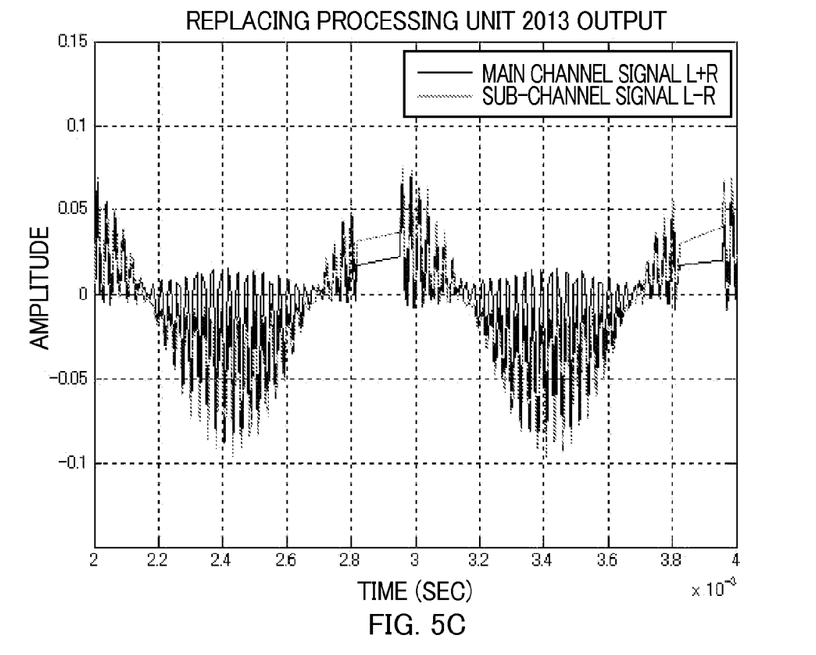
FIG. 5C is a waveform chart of a signal output from a replacing processing unit 2013 according to an embodiment of the present invention.

Description will then be made of processing performed at the noise canceler 20 and the audio stage signal processing circuit 21, with reference to waveform charts shown in FIGS. 5A to 5C.

FIG. 5A shows the waveform of the signal output from the low-pass filter 2011 when the main channel signal (L+R) and the sub-channel signal (L−R) shown in FIG. 9A are input to the noise canceling processing unit 201. Comparison of FIG. 5A and FIG. 9B will indicate that the pulse width of the pulse noise has a smaller extension in FIG. 5A than in 9B.

FIG. 5B shows the waveform of the main channel signal (L+R) and the sub-channel signal (L−R) output from the interpolation processing unit 2012. As shown in FIG. 5B, the interpolation processing is performed for the interpolation period during which the pulse noise is present by the processing of interpolation processing unit 2012.

FIG. 5C shows the waveform of the signal output from the replacing processing unit 2013. As shown in FIG. 5C, out of the main channel signal (L+R) and the sub-channel signal (L−R) not passing through the low-pass filter 2011 shown in FIG. 9A, such part of the signal that is present during the interpolation period is replaced with the signal interpolated at the interpolation processing unit 2012.

Figure 6A:
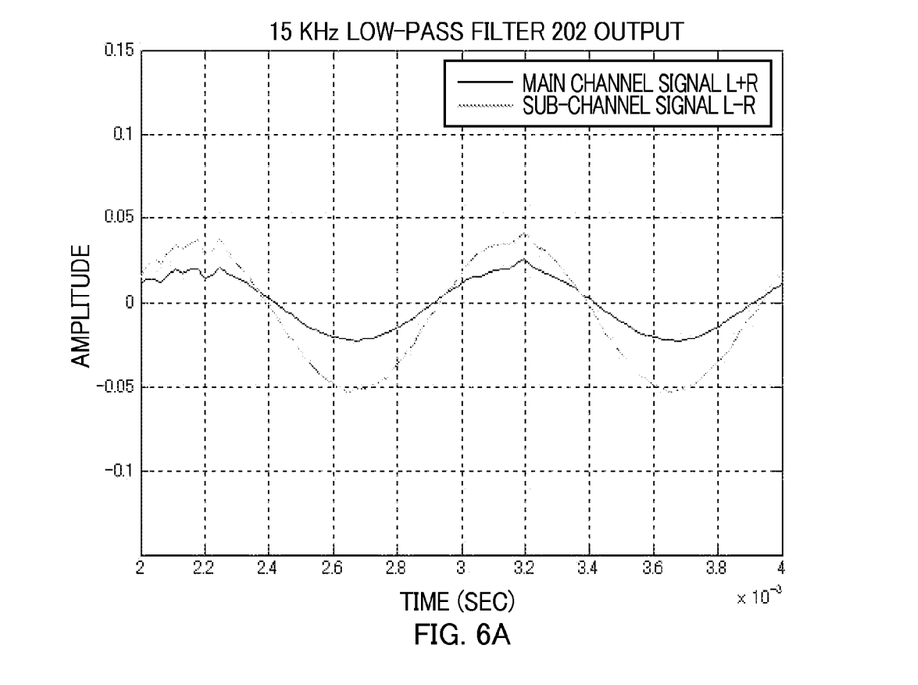
FIG. 6A is a waveform chart of a signal output from a low-pass filter 202 according to an embodiment of the present invention.
Figure 6B:
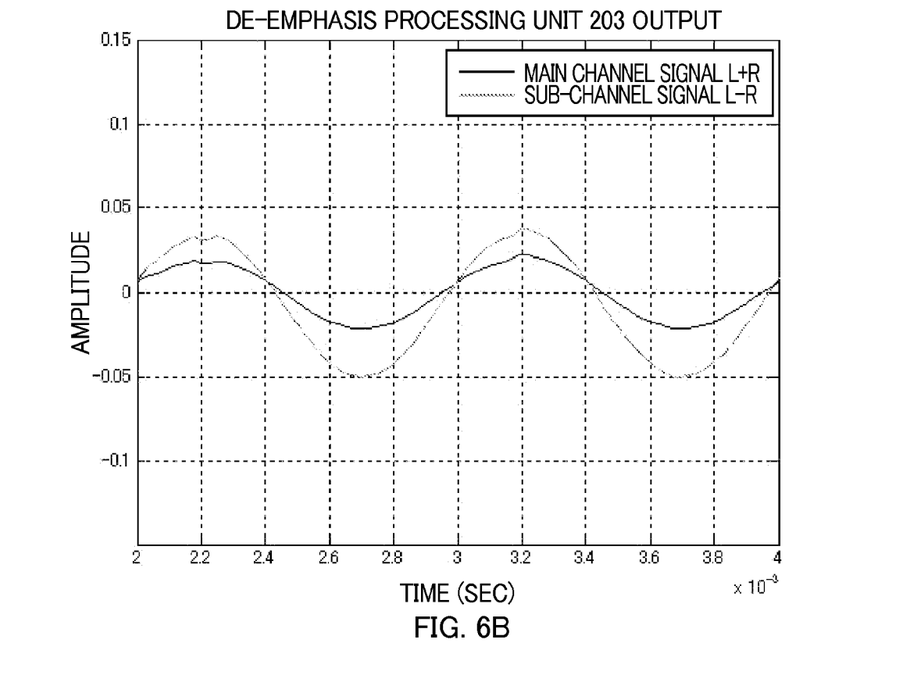
FIG. 6B is a waveform chart of a signal output from a de-emphasis processing unit 203 according to an embodiment of the present invention.
Figure 6C:
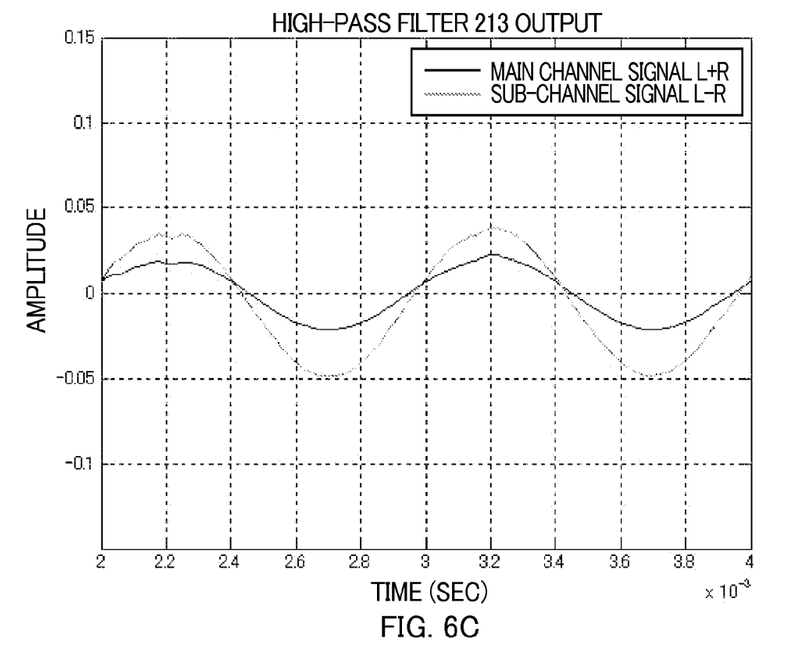
FIG. 6C is a waveform chart of a signal output from a high-pass filter 213 according to an embodiment of the present invention.
Figure 6D:
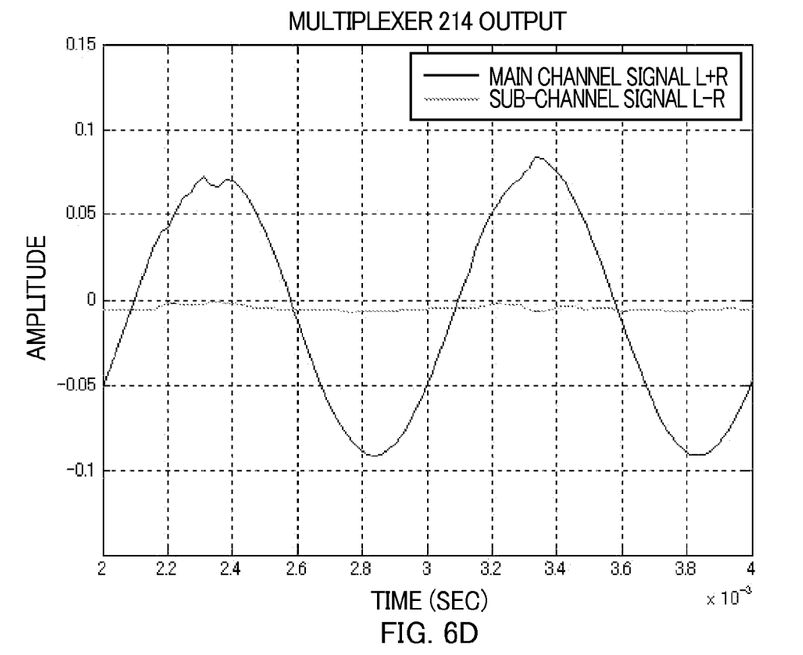
FIG. 6D is a waveform chart of a signal output from a multiplexer 214 according to an embodiment of the present invention.

FIG. 6A shows the waveform of the signal output from the low-pass filter 202 and FIG. 6B shows the waveform of the signal output from the de-emphasis processing unit 203. FIG. 6C shows the waveform of the signal output from the high-pass filter 213 and FIG. 6D shows the waveform of the signal output from the multiplexer 214. Comparison of FIG. 6D and FIG. 9F will indicate that the interpolation period is shorter in FIG. 6D than in FIG. 9F and that the waveform of the signal shown in FIG. 6D has a smaller distortion than the waveform of the signal shown in FIG. 9F does.

The above embodiments of the present invention are simply for facilitating the understanding of the present invention and are not in any way to be construed as limiting the present invention. The present invention may variously be changed or altered without departing from its spirit and encompass equivalents thereof. The noise canceling processing unit 201 can be applied, for example, to the AM receiving apparatus as well.

It is claimed:

1. A noise canceler comprising:
   a first low-pass filter that a demodulated signal is to be input to;
   an interpolation processing unit that the demodulated signal after passing through the first low-pass filter and a pulse noise detection signal indicating presence of a pulse noise, are to be input to,
      the interpolation processing unit configured to perform interpolation processing on a demodulated signal present during a period determined by the pulse noise detection signal, out of the input demodulated signal, based on the input demodulated signal;
   a replacing processing unit that the demodulated signal subjected to the interpolation processing, the pulse noise detection signal, and the demodulated signal before passing through the first low-pass filter, are to be input to,
      the replacing processing unit configured to output a signal obtained by replacing
         a demodulated signal present during the period, out of the demodulated signal before passing through the first low-pass filter, with
            the demodulated signal subjected to the interpolation processing, wherein the demodulated signal is present during the period; and
   a second low-pass filter that the signal output from the replacing processing unit is to be input to, the second low-pass filter including a cut-off frequency higher than that of the first low-pass filter.

2. The noise canceler of claim 1, wherein
   an inclination of frequency-attenuation amount characteristics of the first low-pass filter in the neighborhood of the cut-off frequency is smaller than an inclination of frequency-attenuation amount characteristics of the second low-pass filter in a neighborhood of the cut-off frequency.

3. A receiving apparatus comprising:
   a front end circuit converting a received signal to an intermediate frequency signal;
   a detecting circuit generating a demodulated signal obtained by demodulating the intermediate frequency signal;
   a pulse noise detecting unit generating a pulse noise detection signal indicating presence of a pulse noise in the received signal; and
   a noise canceler, the demodulated signal and the pulse noise detection signal being input thereto, and removing the pulse noise in the demodulated signal,
   the noise canceler comprising:
      a first low-pass filter that a demodulated signal is to be input to;
      an interpolation processing unit that the demodulated signal after passing through the first low-pass filter and a pulse noise detection signal indicating presence of a pulse noise, are to be input to,
         the interpolation processing unit configured to perform interpolation processing on a demodulated signal present during a period determined by the pulse noise detection signal, out of the input demodulated signal, based on the input demodulated signal;
      a replacing processing unit that the demodulated signal subjected to the interpolation processing, the pulse noise detection signal, and the demodulated signal before passing through the first low-pass filter, are to be input to,
         the replacing processing unit configured to output a signal obtained by replacing
            a demodulated signal present during the period, out of the demodulated signal before passing through the first low-pass filter, with
               the demodulated signal subjected to the interpolation processing, wherein the demodulated signal is present during the period; and
      a second low-pass filter that the signal output from the replacing processing unit is to be input to, the second low-pass filter including a cut-off frequency higher than that of the first low-pass filter.

4. The receiving apparatus of claim 3, wherein
   the demodulated signal includes an FM demodulated signal comprising a main channel signal (L+R) and a sub-channel signal (L−R).

* * * * *